(12) United States Patent
Flowerday et al.

(10) Patent No.: US 11,869,043 B2
(45) Date of Patent: *Jan. 9, 2024

(54) ADAPTIVE BIDDING FOR NETWORKED ADVERTISING

(71) Applicant: Quantcast Corporation, San Francisco, CA (US)

(72) Inventors: Crispin Edward Harold Flowerday, San Francisco, CA (US); Faraaz Aejaz Sareshwala, San Francisco, CA (US); Damian John Reeves, San Francisco, CA (US)

(73) Assignee: Quantcast Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/059,210

(22) Filed: Nov. 28, 2022

(65) Prior Publication Data
US 2023/0092018 A1    Mar. 23, 2023

Related U.S. Application Data

(63) Continuation of application No. 17/073,604, filed on Oct. 19, 2020, now Pat. No. 11,514,479, which is a (Continued)

(51) Int. Cl.
*G06Q 30/02* (2023.01)
*G06Q 30/0273* (2023.01)
*G06Q 30/0251* (2023.01)

(52) U.S. Cl.
CPC ........ *G06Q 30/0275* (2013.01); *G06Q 30/02* (2013.01); *G06Q 30/0255* (2013.01)

(58) Field of Classification Search
CPC . G06Q 30/0275; G06Q 30/02; G06Q 30/0255
See application file for complete search history.

(56) References Cited

U.S. PATENT DOCUMENTS 6,963,914 B1   11/2005   Breitbart et al.
8,555,281 B1   10/2013   van Dijk et al.
(Continued)

OTHER PUBLICATIONS

Hongbo Zou et al., "A virtual-service-domain based bidding algorithm for resource discovery in computational grid," 2005, The 2005 IEEE/WIC/ACM International Conference on Web Intelligence (WI'05), pp. 50-53 (Year: 2005).*

(Continued)

*Primary Examiner* — John Van Bramer
(74) *Attorney, Agent, or Firm* — Andrea Wheeler

(57) ABSTRACT

An adaptive bidding system for networked advertising. A bid request is received from an exchange over a network. Each bid request represents the opportunity to bid on an advertising opportunity. A processing time limit is determined based at least in part on a network latency measurement and an exchange reported timeout. The execution of one or more tasks is initiated by the adaptive bidding system. A response is determined from one or more results which are available before the processing time limit expires. The execution of any tasks that have not completed execution before the processing time limit expires are terminated. The response is provided to the exchange.

27 Claims, 4 Drawing Sheets

Related U.S. Application Data continuation of application No. 15/974,912, filed on May 9, 2018, now Pat. No. 10,810,632, which is a continuation of application No. 13/669,157, filed on Nov. 5, 2012, now Pat. No. 9,996,858.

(56) References Cited

U.S. PATENT DOCUMENTS

| | | |
|---|---|---|
| 2003/0198186 A1 | 10/2003 | Hoefelmeyer et al. |
| 2008/0034393 A1 | 2/2008 | Crayford |
| 2009/0300161 A1 | 12/2009 | Pruitt et al. |
| 2010/0228642 A1 | 9/2010 | Baker et al. |
| 2011/0035259 A1 | 2/2011 | Das et al. |
| 2011/0040635 A1 | 2/2011 | Simmons et al. |
| 2011/0040636 A1* | 2/2011 | Simmons ........... G06Q 30/0243 705/14.69 |
| 2011/0246298 A1* | 10/2011 | Williams ............ G06Q 30/02 705/14.71 |
| 2012/0321052 A1 | 12/2012 | Morrill et al. |

OTHER PUBLICATIONS

United States Office Action, U.S. Appl. No. 13/669,157, dated Feb. 9, 2017, 12 pages.

United States Office Action, U.S. Appl. No. 13/669,157, dated May 19, 2016, 13 pages.

United States Office Action, U.S. Appl. No. 13/669,157, dated Jul. 20, 2015, 14 pages.

United States Office Action, U.S. Appl. No. 13/669,157, dated Aug. 29, 2014, 15 pages.

United States Office Action, U.S. Appl. No. 15/974,912, dated Dec. 30, 2019, nine pages.

Zou, H. et al. "A Virtual-Service-Domain Based Bidding Algorithm for Resource Discovery in Computational Grid." Proceeding of the 2005 IEEE/WIC/ACM International Conference on Web Intelligence (WI'05), Sep. 19-22, 2005, pp. 1-4.

United States Office Action, U.S. Appl. No. 17/073,604, dated Apr. 13, 2022, eight pages.

\* cited by examiner

| Task List |
|---|
| 1. Shoe Campaign: Determine suggested bid price by applying the shoe campaign comprehensive model to media consumption history and information in bid request |
| 2. Shoe Campaign: Determine suggested bid price by applying the shoe campaign behavioral model to media consumption history. |
| 3. Shoe Campaign: Determine suggested bid price by applying the shoe campaign context model to information in bid request |
| 4. Shoe Campaign: Lookup intended recipient in shoe campaign retargeting list |
| 5. Shoe Campaign: Adjust bid price according to shoe campaign seasonality model |
| 6. Shoe Campaign: Suggest advertising creative based information in bid request. |
| 7. Shoe Campaign: Suggest advertising customization based on media consumption history of intended recipient |
| 8. Car Campaign: Determine suggested bid price by applying the car campaign comprehensive model to media consumption history and information in bid request |
| 9. Car Campaign: Determine suggested bid price by applying the car campaign behavioral model to media consumption history. |
| 10. Car Campaign: Determine suggested bid price by applying the car campaign context model to information in bid request |
| 11. Car Campaign: Lookup intended recipient in car campaign retargeting list |
| 12. Car Campaign: Adjust bid price according to car campaign seasonality model |
| 13. Car Campaign: Suggest advertising creative based information in bid request. |
| 14. Car Campaign: Suggest advertising customization based on media consumption history of intended recipient |

A bid request is received at the adaptive bidding system 100(Step 410).

A processing time limit for the bid request is determined at the bid analysis system (Step 420).

The execution of one or more tasks for bid request analysis is initiated (Step 430).

A response is determined from one or more partial results which are available before the processing time limit expires (Step 440).

A response is provided to the exchange (Step 450).

FIG. 4

ADAPTIVE BIDDING FOR NETWORKED ADVERTISING

BACKGROUND

Cross Reference to Related Applications

This application is a continuation of U.S. Non-Provisional application Ser. No. 17/073,604 entitled "Adaptive Bidding for Networked Advertising" by Crispin Edward Harold Flowerday, Faraaz Aejaz Sareshwala and Damian John Reeves filed on Oct. 19, 2020, which is a continuation of U.S. Non-Provisional application Ser. No. 15/974,912 entitled "Adaptive Bidding for Networked Advertising" by Crispin Edward Harold Flowerday, Faraaz Aejaz Sareshwala and Damian John Reeves filed on May 9, 2018, now U.S. Pat. No. 10,810,632, issued Oct. 20, 2020, which is a continuation of U.S. Non-Provisional application Ser. No. 13/669,157 entitled "Adaptive Bidding for Networked Advertising" by Crispin Edward Harold Flowerday, Faraaz Aejaz Sareshwala and Damian John Reeves, filed on Nov. 5, 2012, now U.S. Pat. No. 9,996,858 issued on Jun. 12, 2018, all of which are hereby incorporated by reference in their entirety.

FIELD OF INVENTION

The invention relates to selecting bid prices for submission to online advertising exchanges under variable conditions.

DESCRIPTION OF RELATED ART

Online advertising opportunities are bought and sold through various exchanges such as Real Time Bidding (RTB) exchanges and online advertising auction systems. For example, an exchange may provide a stream of bid requests, or "call-outs" to a bidder, with each bid request describing an advertising opportunity available for bidding. Typically, an exchange notifies bidders of a minimum time-to-respond. Increasingly, bidders are utilizing sophisticated analyses to determine which advertising opportunities are of interest and how much to bid on them. Many bidders may not be capable of responding to all of the bid opportunities available through an exchange within the limited time window. Furthermore, the responses which are sent can be subject to variable network delays, resulting in bid responses which arrive at the exchange too late for consideration. Some exchanges may reduce the volume of "call-outs" provided to a bidder with a poor response rate.

What is needed is a way for auction participants to take advantage of the available processing time window, which can be variable, and reliably provide timely responses.

SUMMARY

Embodiments of the invention provide a method, a non-transitory computer-readable storage medium and a system for adaptive bidding for networked advertising. In an embodiment, a bid request is received from an exchange over a network at an adaptive bidding system. A bid request is a request to bid on an advertising opportunity. The adaptive bidding system determines a processing time limit for the bid request, based at least in part on a network latency measurement and the exchange reported timeout value. The processing time limit also includes a buffer allotting time to generate a response from one or more partial results. In some cases, the bid request can include the exchange reported timeout value, which is not necessarily the same for all bid requests. The adaptive bidding system initiates one or more tasks for bid request analysis. A task can generate one or more partial results, which are made available for additional processing. A response to the bid request is determined from one or more partial results which are available before the processing time limit expires. The response is provided to the exchange over the network. Advantageously, the adaptive bidding system can adaptively take advantage of longer processing times when network latency is low or exchange reported timeouts are long, and reduce the likelihood of tardy responses when network latency is high or exchange reported timeouts are short.

In some embodiments, the adaptive bidding system can provide the processing time limit to a task manager, which may select a set of tasks for execution based on the processing time limit.

In some embodiments, the adaptive bidding system can provide the processing time limit to a task manager, which may prioritize a set of tasks for execution based on the processing time limit.

Advantageously, in an embodiment, realistic estimation of the available processing time for responding to a bid request in conjunction with a flexible bid analysis process enables the adaptive bidding system to efficiently analyze each bid request, while still remaining responsive to an online exchange.

BRIEF DESCRIPTION OF DRAWINGS

FIG. 2 illustrates an example list of tasks which can be initiated by a task manager;

DETAILED DESCRIPTION OF THE INVENTION

Figure 1:
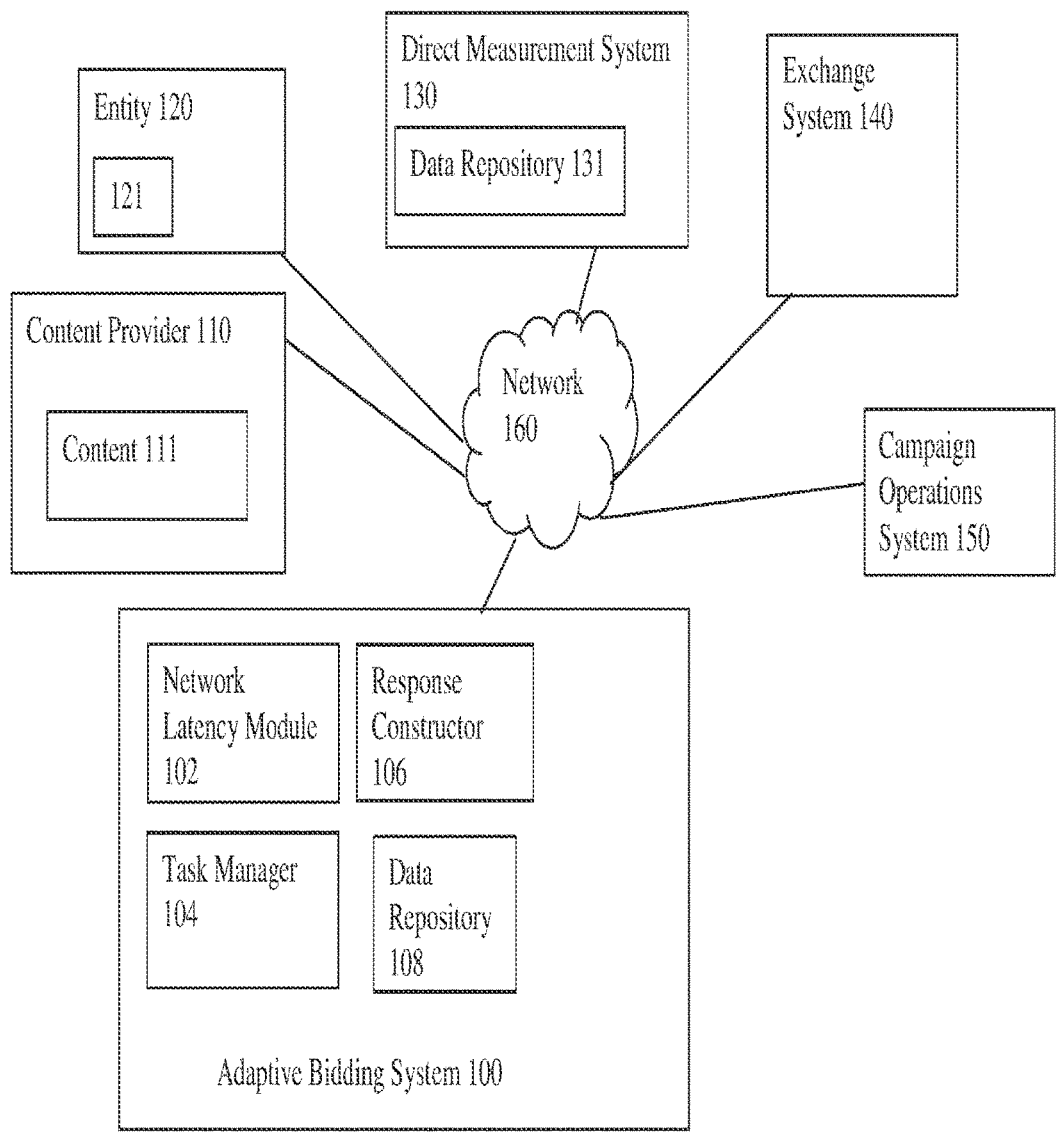
FIG. 1 illustrates an example computing environment in accordance with an embodiment.

FIG. 1 illustrates an example computing environment in accordance with an embodiment. As shown in FIG. 1, the computing environment includes an adaptive bidding system 100, a content provider 110, at least one entity 120, a direct measurement system 130, an exchange system 140 and a campaign operations system 150. These elements are connected by a communication network 160, such as a local area network, a wide area network, a wireless network, an intranet, a cable network, a satellite network, a cellular phone network, an optical network, the Internet or combinations thereof.

Content provider 110 provides content 111 over the communication network 160 to entity 120. Examples of a content provider 110 can include web site operators and cable television operators. Examples of content 111 can include, but are not limited to, a webpage, a portion of an online video clip, a portion of a networked television program, a portion of a cable television program, a portion of a satellite television program, a portion of an Internet Protocol (IP) television program, a portion of an online audio clip, the results of a keyword search from an online search engine, the results of a request for directions from an online mapping service, advertising content and interfaces for making online purchases.

Content can be identified using a content descriptor, such as, but not limited to, a name, a filename, an identifier, an IP address, a network address, a URL, a domain name, a hostname or combinations thereof. Content descriptors may or may not be unique. For example, website content can change as websites are updated over time; a content descriptor such as a URL without an associated time and date stamp can be non-unique. In another example, aggregate content such as the collection of webpages accessible through a website, can be identified with a single content descriptor, such as a domain name. In some examples, the content 111 can be provided based on a request to the content provider 110; in some examples, the content provider 110 can push the content 111. Although only one content provider 110 is shown in FIG. 1 for clarity, any number of content providers may be connected to the communication network 160.

In various embodiments, entity 120 accesses content 111 from content provider 110 over the communication network 160. Examples of entities can include consumers, software installations or hardware devices used to access content or combinations thereof. A consumer is a person or group of people who access content. Software installations can include a web browser instance, video viewer instance or set-top box software residing on a hardware device. A hardware device can comprise a computer, personal digital assistant (PDA), cell phone or set-top unit (STU) such as a STU used in conjunction with cable television service. In some cases, an entity 120 can comprise a combination of entities which are logically grouped together to represent individuals, households or groups of individuals who access content 111. Although only one entity 120 is shown in FIG. 1 for clarity, any number of entities may be connected to the communication network 160.

As shown in the embodiment of FIG. 1, an identifier 121 is stored in entity 120. For example, a hardware device identifier such as a Media Access Control Address (MAC address) can be stored on a device. A software identifier such as a cookie value can be stored locally. In another embodiment, identifiers can be partially or wholly composed and/or stored remotely from an entity. In an example, identifiers do not comprise personally identifiable information (PII) such as a person's name or street address.

An advertising exchange, such as exchange system 140, is an electronic marketplace for buying and selling advertising impressions, such as the opportunity to expose an entity to advertising content delivered over a network. In an example, a real time bidding (RTB) advertising exchange can support the rapid auction of advertising opportunities as they become available. For example, the exchange 140 can be notified by a content provider after an entity requests content from the content provider and an opportunity to provide an advertising impression to that entity becomes available. The exchange 140 can provide a stream of bid requests to a bidder, with each bid request representing a request to bid on an advertising opportunity with an intended recipient. Examples of exchanges include first price auction systems and second price auction systems.

A bid request can comprise information related to an advertising opportunity available for bid. For example, the exchange may provide advertising opportunity characteristics in a bid request which describe the advertising impression opportunity, such as the size of the advertising impression, the position of the advertising impression with respect to a web page, the website location of the advertising impression, the context or topic of the display webpage associated with the advertising impression or combinations thereof.

In some cases, the exchange may provide information in the bid request, such as details related to the entity representing the intended recipient of the advertising impression such as, but not limited to, the local time of day for that entity, the entity's media market in the form of a Designated Market Area (DMA), an entity identifier or combinations thereof.

Some exchange systems enable auction participants to set or retrieve an entity identifier, such as a browser cookie, with the entity which is the intended recipient of the advertising opportunity's advertising impression. For example, this can enable the auction participants to maintain or access a partial media consumption history with respect to an entity. In some cases, the adaptive bidding system can be integrated with a direct measurement system 130 or other systems which can take advantage of this feature, enabling the adaptive bidding system to access collected, measured or inferred advertising opportunity characteristics stored in a variety of systems which may be internal or external to the adaptive bidding system.

An exchange reported timeout value describes the amount of time the bidders have to provide a response to a bid request. The exchange reported timeout value can be measured from the time the exchange issues the bid request to the time the exchange receives the response to the bid request; however, the exchange can use other time origins to initiate the countdown for the exchange reported timeout and/or other endpoints to determine compliance with an exchange reported timeout. Responses from bidders returned to the exchange within the exchange reported timeout value can be considered by the exchange. In some cases, an exchange may provide an exchange reported timeout value, applicable to some or all bid requests. In some cases, exchange reported timeout values may be provided in conjunction with each bid request. An exchange system 140 receives responses to the bid request which can include a bid price, selects the winning bid and enables the winning bidder to send the advertising content to the entity 120. In some cases, an advertising server system (not shown) may be integrated into the process, and the advertising content may be served to the entity 120 by the advertising server system on behalf of the winning bidder.

Some exchange systems monitor the responsiveness of bidders, and may take undesirable actions with respect to bidders which are not consistently responsive. For example, an exchange may choose to throttle bid requests provided to some bidders. To avoid undesirable actions, a bidder can provide a timely response including a "decline to bid" message to the exchange system, which may be considered responsive to the bid request by some exchange systems. Although only one exchange system 140 is shown in FIG. 1 for clarity, any number of exchange systems may be connected to the communications network 160.

A direct measurement system, such as direct measurement system 130 can collect information for an entity 120. Direct measurement system 130 includes a data repository 131, which is a data store such as a database, for storing information. Information can include a consumption history for an entity 120 and attribute values. For example, a consumption history can document one or more media consumption events. A media consumption event records the act of accessing content 111 over a network 160 by an entity 120, such as, but not limited to, an entity accessing a web page from a web server. In some cases, media consumption events can comprise conversion events. In an example, a content descriptor for identifying the content 111 can become part of the consumption history. In some cases, additional information such as the referring webpage and search terms used to locate the content can be collected by the direct measurement system 130. In the embodiment illustrated in FIG. 1, direct measurement system 130 is external to the adaptive bidding system 100. However, in other embodiments, one or more direct measurement systems may be internal to the adaptive bidding system 100 instead of or in addition to one or more external direct measurement systems.

In some cases, a direct measurement system 130 can collect information in conjunction with an identifier. For example, information can be collected in conjunction with an identifier in order to maintain a coherent body of information for an entity comprising a consumption history and information. The identifier can comprise an identifier such as identifier 121 stored on the entity and/or an identifier stored and/or composed remotely from the entity.

In an example, the information collected in conjunction with the consumption history can comprise attribute values. For example, attribute values can comprise known, collected, received, cross-referenced, inferred, estimated, processed or calculated information related to an entity 120 which is not part of a consumption history. The estimated household size associated with an entity 120 and the average household income for the zip code associated with an entity 120 are examples of attribute values. In some cases, attribute values can be assessed or described using probabilities. For example, an attribute value can reflect that there is a 90% chance that the household income for a family group owning an entity earns between $75,000 and $100,000 per year. In some cases, information can be received and processed into a processed attribute value. For example, attribute values can comprise information which has been statistically obfuscated to address privacy concerns.

In an example, the context of a consumption event, such as the quality of the consumption event, can be part of the consumption history. For example, information associated with the hardware and software volume settings during the delivery of an audio advertisement can be collected. For an entity that is a physical device, other information can describe a hardware or software configuration and can be included in the consumption history.

A campaign operations system 150 can participate in the online advertising market by operating a networked advertising campaign. In an example, a campaign operations system 150 can operate a networked advertising campaign by automatically purchasing advertising impressions or authorizing the purchase of advertising impressions, and enabling their consumption. The advertising impressions can be purchased through one or more systems such as exchange system 140. In some cases, a campaign operation system may use a model, such as a behavioral model, to assess the suitability of an advertising impressions for one or more campaigns, to determine a bid price or both.

In an example, the exchange system 140 can be a Real Time Bidding (RTB) advertising exchange and the advertising impressions may be purchased through an auction. A campaign operations system can receive information about an available advertising impression and then determine which advertising impressions are a good match, how much to bid on an advertising impression, which advertising creative to use, customization of an advertising creative or combinations thereof. The campaign operation system can integrate with external systems, such as advertising server system, to enable the consumption of an advertising opportunity won in an auction. In some cases, a campaign operations system operates a single networked advertising campaign, but in other examples, a single campaign operation system may be configured to operate multiple networked advertising campaigns for multiple advertisers.

In an example embodiment of the invention, adaptive bidding system 100 includes a network latency module 102 for determining a processing time limit for a bid request, a task manager 104 for initiating tasks related to bid request analysis, a response constructor 106 for constructing a response to a bid request based on one or more partial responses and a data repository 108.

Adaptive bidding system 100 receives bid requests over a network from one or more exchanges, with each bid request representing a request to bid on an advertising opportunity. In some cases, a bid request can include an exchange reported timeout value indicating the maximum amount of time that the bid analysis has to return a response to the exchange for consideration. In some cases, an exchange may make an exchange reported timeout value available through other communication channels, such as providing the exchange reported timeout value or a default exchange reported timeout value in documentation provided to the bidders. In some cases, the exchange reported timeout value can be stored in a data repository 108.

Network latency module 102 can determine the processing time limit based at least in part on a network latency measurement, the applicable exchange reported timeout value and a bid response buffer to account for the time allotted to generate a response based on one or more partial results. A network latency measurement is used to predict the time required to compensate for the expected network latency related to the bidding process. For example, one part of the network latency corresponds to the time required for the bid request to travel over the network from the exchange to the adaptive bidding system and a second part of the network latency corresponds to the time required for the response to the bid request to travel from the adaptive bidding system to the exchange. Some fluctuations in network latency are to be expected based on changing network traffic conditions. In addition, some exchanges may provide bid requests from various locations, networks and sub-networks over time, so the expected network latency can vary from bid request to bid request, even for bid requests originating from the same exchange.

A network latency module 102 can rely on operating system measurements of the network latency per network address, such as the round trip time. In some cases, measurements of network latency may be further processed into parameters such as the exponential moving average of the round trip time. In some cases, the network latency module 102 can guess that a set of network addresses represent co-located exchange systems which communicate over similar or identical network pathways incurring similar network latency patterns. For example, in a TCP/IP implementation, a network latency measurement may be assessed based on measurements for an IP address range, and applicable to determining processing time limits for bid requests originating from the same IP address range.

To ensure accuracy, the network latency measurement may be subject to a freshness standard. For example, a freshness standard may require that at least some portion of the network latency measurement has been acquired within the last second or last minute. In some cases, this can correspond to taking a relevant network latency measurement for a round trip between two IP addresses or two IP address ranges within a time window specified by the freshness standard. For network latency measurements which are subject to further processing, such as network latency measurements which are processed into parameters such as the exponential moving average of the round trip time, the freshness standard can require that the parameter be determined using at least one measurement taken within a time window specified by the freshness standard.

In some cases, network latency module 102 or other modules in adaptive bidding system 100 may account for time consumed with internal processing overhead, fluctuations in internal resource availability, fluctuations in network latency related to internal or external systems or modules other than the exchange or other concerns when determining the processing time limit.

A task manager 104 can initiate the execution of one or more tasks for bid request analysis. A task can be executed on a system or module which is internal to the adaptive bidding system, external to the adaptive bidding system or partially external to the adaptive bidding system. A task can make a partial result available. Partial results which are available before the processing time limit expires can be considered when the adaptive bidding system determines a response to a bid request. For example, a task can analyze a bid request, the media consumption history of the entity representing the intended recipient of the advertising impression or both to make a partial result available. The partial result may suggest a bid price, an advertising campaign, creative content, content customization or combinations thereof.

In some cases, the adaptive bidding system may rely partially or wholly on a campaign operations system to determine which advertising impressions are a good match, determine how much to bid on an advertising impression, determine an advertising creative to use, customize an advertising creative or combinations thereof. The campaign operation system can integrate with external systems, such as advertising server system, to enable the consumption of an advertising opportunity won in an auction. In some cases, a campaign operations system operates a single networked advertising campaign, but in other examples, a single campaign operation system may be configured to operate multiple networked advertising campaigns for multiple advertisers. In FIG. 1, the campaign operation system 150 is external to the adaptive bidding system 100. However, in other embodiments, one or more campaign operation system 150 can be internal to adaptive bidding system 100 in addition to or instead of one or more external campaign operations systems.

In an embodiment, the task manager 104 can initiate one or more tasks for bid request analysis. FIG. 2 illustrates an example list of tasks which can be initiated by a task manager. Task manager 104 may identify a comprehensive list of all tasks available on the adaptive bidding system. In some cases, the task manager may assemble a list of tasks which are applicable to the newly received bid request, excluding some or all inapplicable tasks. Task manager 104 may assess dependencies between tasks to properly sequence or parallelize tasks. For example, "Task 5" in FIG. 2 is "Shoe Campaign: Adjust bid price according to shoe campaign seasonality model" and can only be executed after a proposed bid price has been determined as the partial result of Tasks 1-4.

In some cases, two or more tasks may leverage the same activity. For example, the media consumption history for the entity representing the intended recipient of the advertising impression may be retrieved once, but used by multiple tasks.

In an embodiment, the task manager 104 may prioritize or synchronize tasks for initiation. In some cases, tasks may be prioritized for operation based on the predicted completion time for the tasks in light of the network latency measurement, the exchange reported timeout or the processing time limit. In some cases, tasks may be prioritized based on the features of the bid request, such as the topic, or the media consumption history of the entity representing the intended recipient of the advertising impression.

In some cases, a partial result may be cumulative, so that a partial result which is newly available supersedes an older partial result. For example, a newly available partial result, such as the result of Task 5 "Adjust bid price according to shoe campaign seasonality model" may take into account older partial results such as the partial results from the execution of Tasks 1-3.

An adaptive bidding system can have a minimum time budget which represents the amount of time required to complete analysis of the bid request and generate a response. An adaptive bidding system may pursue various strategies for generating a response to a bid request with a short processing time limit, such as a processing time limit that is close to or less than the minimum time budget. For example, the adaptive bidding system can provide a response comprising a message acknowledging the receipt of the bid request and informing the exchange that the adaptive bidding system has declined to bid on the bid request. In another example, the adaptive bidding system can submit a minimal bid in response to the bid request on behalf of an advertiser running an unconstrained exposure campaign or for a public service announcement.

In some cases, the bid request may be assessed on behalf of multiple campaigns or sub-campaigns and the adaptive bidding system 100 can provide a response to a bid request on behalf of one campaign or sub-campaign. In an example, the presumed value of the advertising exposure to a campaign can be assessed per campaign or sub-campaign and used by the adaptive bidding system 100 to select a campaign or sub-campaign per response. In some cases, the calculated bid price can reflect the presumed value of the advertising exposure to a campaign. However, in other cases, the calculated bid price and the presumed value of the advertising exposure to a campaign may not be directly related and may be determined separately. In some cases, preferentially selecting or prioritizing tasks which tend to indicate campaigns which assign high presumed values to advertising exposures, or skipping tasks which tend to be related to campaigns which assign low presumed values to advertising exposures. In another example, the task manager may use a task weighting strategy when prioritizing tasks, preferentially weighting tasks associated with campaigns which are under-served to increase their access to advertising opportunities.

Response constructor 106 constructs the response to the bid request based on one or more partial results before the processing time limit has elapsed, and provides the response to the exchange. The response constructor 106 can keep track of elapsed time to ensure that the response to the exchange is provided in a timely manner and provide a response to the exchange based on whatever partial results are available in order to prevent a tardy response to the exchange.

The response to the bid request includes a bid price. In some cases, the advertising creative or directions for acquiring the advertising creative are included in the response to the bid request. In some cases, additional information, such as information which may be used to customize the advertising creative can also be included in the response to the bid request.

Figure 3:
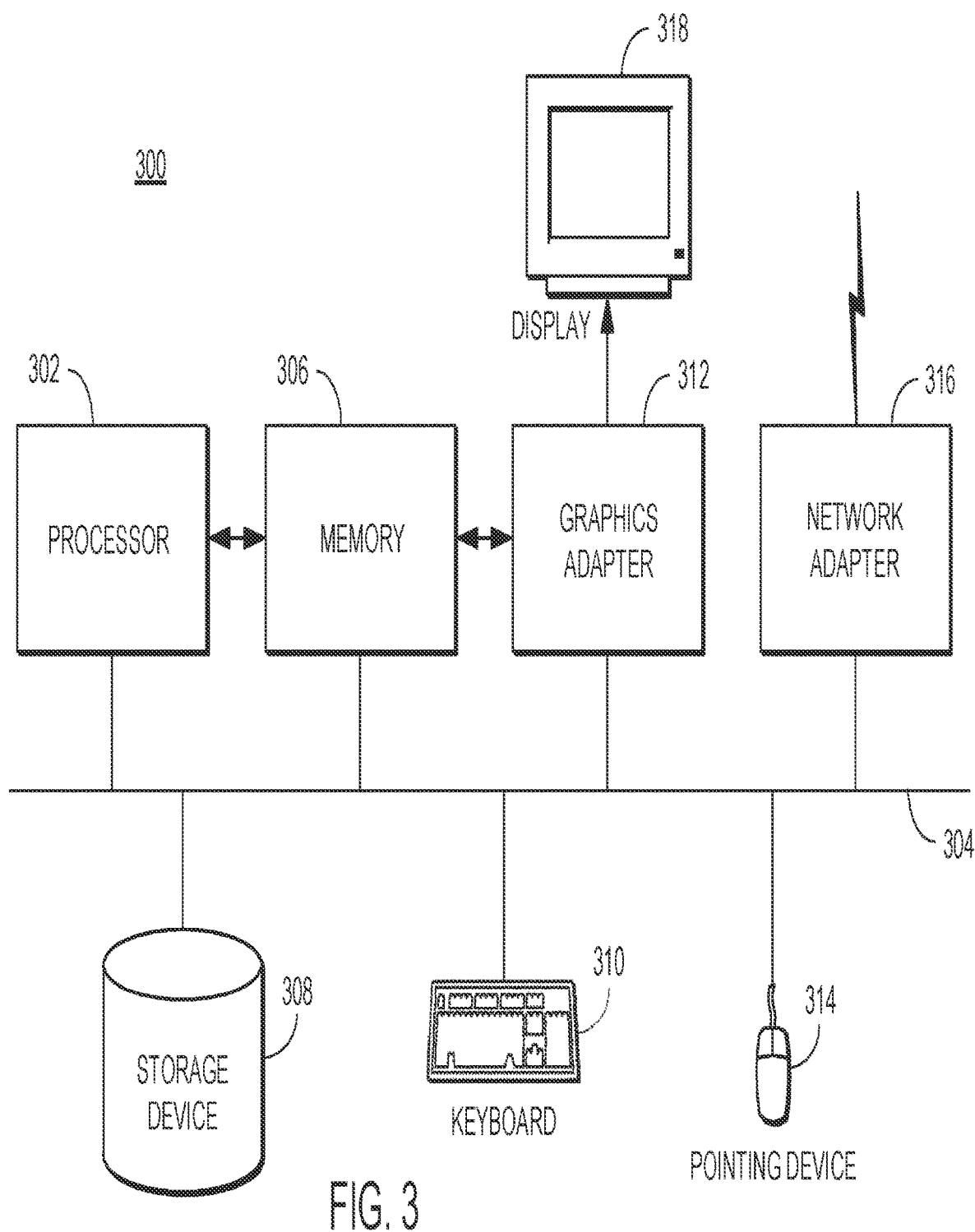
FIG. 3 is a high-level block diagram illustrating an example of a computer for use as an adaptive bidding system, a content provider, an entity, a direct measurement system, an advertising exchange system and/or an campaign operations system of FIG. 1; and, FIG. 4 illustrates is a flow chart illustrating an example of a method for adaptive bidding, in accordance with an embodiment.

FIG. 3 is a high-level block diagram illustrating an example of a computer for use as an adaptive bidding system 100, a content provider 110, an entity 120, a direct measurement system 130, an exchange system 140 and/or a campaign operations system 150 of FIG. 1. Illustrated are a processor 302 coupled to a bus 304. Also coupled to the bus 304 are a memory 306, a storage device 308, a keyboard 310, a graphics adapter 312, a pointing device 314, and a network adapter 316. A display 318 is coupled to the graphics adapter 312.

FIG. 3 is a processor 302 may be any general-purpose processor. The storage device 308 is, in one embodiment, a hard disk drive but can also be any other device capable of storing data, such as a writeable compact disk (CD) or DVD, or a solid-state memory device. The memory 306 may be, for example, firmware, read-only memory (ROM), non-volatile random access memory (NVRAM), and/or RAM, and holds instructions and data used by the processor 302. The pointing device 314 may be a mouse, track ball, or other type of pointing device, and is used in combination with the keyboard 310 to input data into the computer 300. The graphics adapter 312 displays images and other information on the display 318. The network adapter 316 couples the computer 300 to the network (not shown). In one embodiment, the network is the Internet. The network can also utilize dedicated or private communications links that are not necessarily part of the Internet.

As is known in the art, the computer 300 is adapted to execute computer program modules. As used herein, the term "module" refers to computer program logic and/or data for providing the specified functionality. A module can be implemented in hardware, firmware, and/or software. In one embodiment, the modules are stored on the storage device 308, loaded into the memory 306, and executed by the processor 302. The computer 300 is configured to perform the specific functions and operations by various modules, for example as detailed in FIG. 4, and thereby operates as a particular computer under such program control. The types of computers 300 utilized by the entities of FIG. 1 can vary depending upon the embodiment and the processing power utilized by the entity.

FIG. 4 is a flow chart illustrating an example of a method 400 for adaptive bidding, according to an embodiment. Referring to Step 410, a bid request is received at the adaptive bidding system 100. A bid request comprises a request to bid on an advertising opportunity. In some cases, the bid request can include an exchange reported timeout value. The bid request can also include advertising opportunity characteristics, such as the size of the advertising impression, the position of the advertising impression with respect to a web page, the website location of the advertising impression, the context or topic of the display webpage associated with the advertising impression or combinations thereof.

Referring to Step 420, a processing time limit for the bid request is determined based at least in part on a network latency measurement, an exchange reported timeout value and a bid response buffer which accounts for the time allotted to generate a response based on one or more partial results. In some cases, the processing time limit can be determined in two or more steps. For example, a preliminary processing time limit can be determined based on the network latency measurement and the exchange reported timeout value. Later, a bid response buffer can be allocated based on the expected number of partial results, and included in an updated processing time limit. In another example, the processing time limit may be updated based on a fresh network latency measurement or information related to the timing of processes internal or external to the adaptive bidding system.

Referring to Step 430, the execution of one or more tasks for bid request analysis is initiated. In some cases, the task manager can initiate one or more tasks which are on external systems, such as an external campaign operations system 150. In some cases, the task manager can initiate a sequence of tasks, initiate parallel operation of tasks or both. In some cases, tasks may be selected or prioritized based on the features of the bid request, such as the topic, or the media consumption history of the entity representing the intended recipient of the advertising impression. In some cases, tasks can have an estimated time required for completion, and tasks may be selected or prioritized based on consideration of the estimated time required for completion and the processing time limit. For example, tasks which are not expected to generate a partial result before the processing time limit expires would not be selected or initiated.

Referring to Step 440, a response is determined from one or more partial results which are available before the processing time limit expires. In some cases, partial results which are not made available to the response constructor 106 in time for consideration when constructing the response are simply ignored. In some cases, the adaptive bidding system may attempt to conserve resources by terminating tasks which are still operating when the processing time limit expires. In some cases, the adaptive bidding system may prevent the initiation of tasks which are queued up for operation at the time the processing limit expires.

Referring to Step 450, a response is provided to the exchange. The response can comprise a bid price or an indication that the adaptive bidding system has declined to bid on the advertising opportunity associated with the bid request. In some cases, the response can also include an advertising creative, instructions to retrieve an advertising creative, instructions to customize an advertising creative or combinations thereof.

In some embodiments of the invention, a processing time limit may be determined for each bid request, enabling the adaptive bidding system to remain responsive in spite of variations in network latencies across multiple bid requests. Similarly, a bid analysis process may be customized by the task manager for each bid request to take the best advantage of the available processing time by limiting low priority tasks when a processing time limit is determined to be short and designing a more time consuming, and presumably more accurate, bid analysis process when time permits.

The order of the steps in the foregoing described methods of the invention are not intended to limit the invention; the steps may be rearranged.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

What is claimed is:

1. A method comprising:
    determining, by an adaptive bidding system, a processing time limit for submitting a response to a bid request, wherein the bid request comprises at least one feature, comprising:
        receiving the bid request, from an exchange over a network, wherein the bid request comprises a request to bid on an advertising opportunity;
        receiving an exchange-reported timeout value;
        determining a network latency; and
        determining the processing time limit for submitting the response to the bid request based at least in part on the network latency and the exchange-reported timeout value; and
    responding to the bid request, by the adaptive bidding system, before the processing time limit expires, comprising:
        identifying a plurality of tasks applicable to analyzing the received bid request for at least one of a plurality of campaigns;
        determining a priority corresponding to each of the plurality of tasks according to at least one feature of the bid request;
        initiating execution of one or more of the plurality of tasks based the determined priorities;
        receiving results from the execution of at least one of the plurality of tasks;
        generating a response based the received results;
        providing the response to the exchange over the network; and
        terminating execution of any of the plurality of tasks which have not completed execution when the processing time limit expires.

2. The method of claim 1, wherein determining the priority corresponding to each of the plurality of tasks is further according to dependencies between each task and one or more of the remaining plurality of tasks.

3. The method of claim 1, wherein at least one feature of the bid request is a topic.

4. The method of claim 1, wherein at least one feature of the bid request is a media consumption history of an entity representing an intended recipient of the advertising opportunity.

5. The method of claim 1, wherein:
    receiving results comprises receiving a partial result from the execution of at least one of the plurality of tasks; and
    generating the response comprises generating the response based on the received partial result.

6. The method of claim 1, wherein the response comprises a bid price.

7. The method of claim 1, wherein terminating execution of any of the plurality of tasks which have not completed execution when the processing time limit expires further comprises preventing initiation of execution of any of the plurality of tasks which have not initiated execution when the processing time limit expires.

8. The method of claim 1, wherein at least one feature of the bid request is an advertising characteristic, of the advertising opportunity.

9. The method of claim 8, wherein the advertising characteristic is one of a size of an advertising impression, a position of the advertising impression with respect to a web page, a website location of the advertising impression, and a context of the webpage.

10. A non-transitory computer-readable storage medium storing processor-executable computer program instructions that, when executed, cause a computer processor to perform a method, the method comprising:
    determining, by an adaptive bidding system, a processing time limit for submitting a response to a bid request, wherein the bid request comprises at least one feature, comprising:
        receiving the bid request, from an exchange over a network, wherein the bid request comprises a request to bid on an advertising opportunity;
        receiving an exchange-reported timeout value;
        determining a network latency; and
        determining the processing time limit for submitting the response to the bid request based at least in part on the network latency and the exchange-reported timeout value; and
    responding to the bid request, by the adaptive bidding system, before the processing time limit expires, comprising:
        identifying a plurality of tasks applicable to analyzing the received bid request for at least one of a plurality of campaigns;
        determining a priority corresponding to each of the plurality of tasks according to at least one feature of the bid request;
        initiating execution of one or more of the plurality of tasks based the determined priorities;
        receiving results from the execution of at least one of the plurality of tasks;
        generating a response based the received results;
        providing the response to the exchange over the network; and
        terminating execution of any of the plurality of tasks which have not completed execution when the processing time limit expires.

11. The medium of claim 10, wherein determining the priority corresponding to each of the plurality of tasks is further according to dependencies between each task and one or more of the remaining plurality of tasks.

12. The medium of claim 10, wherein at least one feature of the bid request is a topic.

13. The medium of claim 10, wherein at least one feature of the bid request is a media consumption history of an entity representing an intended recipient of the advertising opportunity.

14. The medium of claim 10, wherein:
    receiving results comprises receiving a partial result from the execution of at least one of the plurality of tasks; and
    generating the response comprises generating the response based on the received partial result.

15. The medium of claim 10, wherein the response comprises a bid price.

16. The medium of claim 10, wherein terminating execution of any of the plurality of tasks which have not completed execution when the processing time limit expires further comprises preventing initiation of execution of any of the plurality of tasks which have not initiated execution when the processing time limit expires.

17. The medium of claim 10, wherein at least one feature of the bid request is an advertising characteristic, of the advertising opportunity.

18. The medium of claim 17, wherein the advertising characteristic is one of a size of an advertising impression, a position of the advertising impression with respect to a web page, a website location of the advertising impression, and a context of the webpage.

19. A system comprising:
a processor; and
a non-transitory computer-readable storage medium storing processor-executable computer program instructions that, when executed, cause a computer processor to perform a method, the method comprising:
determining, by an adaptive bidding system, a processing time limit for submitting a response to a bid request, wherein the bid request comprises at least one feature, comprising:
receiving the bid request, from an exchange over a network, wherein the bid request comprises a request to bid on an advertising opportunity;
receiving an exchange-reported timeout value;
determining a network latency; and
determining the processing time limit for submitting the response to the bid request based at least in part on the network latency and the exchange-reported timeout value; and
responding to the bid request, by the adaptive bidding system, before the processing time limit expires, comprising:
identifying a plurality of tasks applicable to analyzing the received bid request for at least one of a plurality of campaigns;
determining a priority corresponding to each of the plurality of tasks according to the at least one feature of the bid request;
initiating execution of one or more of the plurality of tasks based the determined priorities;
receiving results from the execution of at least one of the plurality of tasks;
generating a response based the received results;
providing the response to the exchange over the network; and
terminating execution of any of the plurality of tasks which have not completed execution when the processing time limit expires.

20. The system of claim 19, wherein determining the priority corresponding to each of the plurality of tasks is further according to dependencies between each task and one or more of the remaining plurality of tasks.

21. The system of claim 19, wherein the at least one feature of the bid request is a topic.

22. The system of claim 19, wherein the at least one feature of the bid request is a media consumption history of an entity representing an intended recipient of the advertising opportunity.

23. The system of claim 19, wherein:
receiving results comprises receiving a partial result from the execution of at least one of the plurality of tasks; and
generating the response comprises generating the response based on the received partial result.

24. The system of claim 19, wherein the response comprises a bid price.

25. The system of claim 19, wherein terminating execution of any of the plurality of tasks which have not completed execution when the processing time limit expires further comprises preventing initiation of execution of any of the plurality of tasks which have not initiated execution when the processing time limit expires.

26. The system of claim 19, wherein at least one feature of the bid request is an advertising characteristic, of the advertising opportunity.

27. The system of claim 26, wherein the advertising characteristic is one of a size of an advertising impression, a position of the advertising impression with respect to a web page, a website location of the advertising impression, and a context of the webpage.

* * * * *